E. H. W. WEIBULL.
SELF ADJUSTING ROLLER BEARING.
APPLICATION FILED SEPT. 3, 1920.
1,371,282.
Patented Mar. 15, 1921.
Fig1.
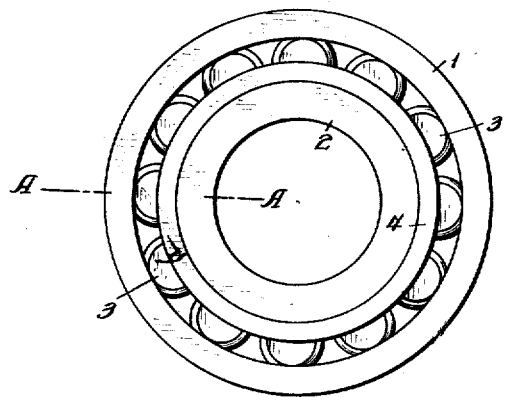
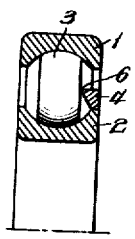
Fig2.
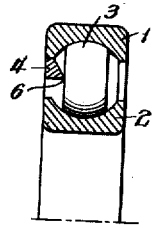
Fig3.
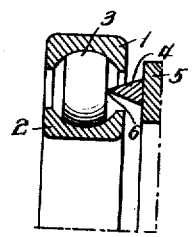
Fig4.
INVENTOR
E. H. W. Weibull
BY
H. R. Kerslake
ATTORNEY

UNITED STATES PATENT OFFICE.

ERNST HJALMAR WALODDI WEIBULL, OF GOTTENBORG, SWEDEN, ASSIGNOR TO NORDISKA KULLAGER AKTIEBOLAGET, OF REGULUSGATAN, LUNDBY, GOTTENBORG, SWEDEN.

SELF-ADJUSTING ROLLER-BEARING.

1,371,282.      Specification of Letters Patent.      Patented Mar. 15, 1921.

Application filed September 3, 1920. Serial No. 408,006.

*To all whom it may concern:*

Be it known that I, ERNST HJALMAR WALODDI WEIBULL, a subject of the King of Sweden, residing at Gottenborg, in the county of Gottenborg and Bohus and Kingdom of Sweden, have invented a new and useful Improvement in Self-Adjusting Roller-Bearings, of which the following is a specification.

This invention refers to roller bearings and more particularly to such roller bearings, where the rollers are self-adjusting, that is to say of such a construction that the axis of revolution of the roller always tends to adjust itself in a proper parallelism to the geometrical axis of the bearing. In such bearings there is no need of any special roller cage. However, it may happen that the rollers, when the bearing is unloaded or does not rotate, will place themselves in such an oblique position relatively to their normal position, that they cannot rotate. The object of this invention is an improvement in roller bearings of the class mentioned and consists principally of the provision of a support against the end-surfaces of the rollers in such a way, that the axis of revolution of the rollers can never move from its normal position, said support being fastened to one of the race rings or to the bearing casing, if existing.

The invention is applied particularly to bearings of the type employing rollers having parallel flat sides, and the distance between the opposite flat sides being less than the distance between the outer edges of the inner and outer race-rings, so that the rollers may be placed on their sides and inserted between the race-rings and finally turned into operating position. In bearings of this type no means have been provided prior to the present time for maintaining the axes of the rollers parallel to the axis of the bearing and my improvement is specifically devised to furnish such means.

The invention is clearly illustrated in the accompanying drawing in which Figure 1 is a side view of a roller bearing. Fig. 2 shows a sectional view through the bearing in Fig. 1 on the line A—A. Fig. 3 is a section through a roller bearing according to a second embodiment, and Fig. 4 shows a section through a roller bearing according to a third embodiment.

Referring to Figs. 1 and 2, 1 indicates the outer race ring and 2 the inner race ring of a roller bearing provided with self-adjusting rollers 3. At the inner ring 2 there is fastened a ring-shaped device 4, which with its inner edge 6 supports against the end surfaces of the rollers. By means of this ring the rollers are prevented from obtaining an oblique position relatively to their normal position, though that surface of the ring 4, which is turned against the rollers, may be of such a shape that the rollers are able to obtain an oblique position relatively to a plane perpendicular to the axis of the bearing.

According to Fig. 3, another embodiment is shown, where the ring 4 is fastened to the outer ring 1 of the bearing.

In the third embodiment as shown in Fig. 4 the ring or support 4 for the rollers is fastened to a further support 5 being independent of the race-rings. Here also the ring 4 is provided with an edge 6.

The embodiments shown are chosen merely as examples and I do not want to limit myself to these embodiments. Thus supporting rings may be arranged at the same time at the outer and inner race ring of the same roller bearing. My invention may also be used in bearings with special roller cages or in bearings without such cages.

Having now described the nature of my invention, what I claim to be new is:

A roller bearing including inner and outer race-rings having oppositely curved grooves and spaced outer edges, rollers having curved peripheries and flat sides mounted between said rings with their peripheral surfaces engaging said grooves, the opposite flat sides of each of said rollers being a less distance apart than the distance between the outer edges of the inner and outer rings in order to permit said rollers to be inserted between the rings, and a ring associated with said rollers and having a reduced edge portion which engages certain of the flat sides of said rollers at points adjacent to the axes of said rollers.

In testimony whereof I have affixed my signature.

ERNST HJALMAR WALODDI WEIBULL.